(12) United States Patent
Kranz

(10) Patent No.: US 8,151,822 B2
(45) Date of Patent: Apr. 10, 2012

(54) INTEGRAL OVERPRESSURE MONITORING DEVICE

(75) Inventor: Seth Kranz, Royse City, TX (US)

(73) Assignee: Fisher Controls International LLC, Marshalltown, IA (US)

( * ) Notice: Subject to any disclaimer, the term of this patent is extended or adjusted under 35 U.S.C. 154(b) by 935 days.

(21) Appl. No.: 12/105,133

(22) Filed: Apr. 17, 2008

(65) Prior Publication Data
US 2008/0257421 A1    Oct. 23, 2008

Related U.S. Application Data

(60) Provisional application No. 60/913,076, filed on Apr. 20, 2007.

(51) Int. Cl.
*F16K 31/36* (2006.01)
(52) U.S. Cl. ......... 137/505.12; 137/505.18; 137/505.47; 137/270
(58) Field of Classification Search ............. 137/505.12, 137/86, 505.47, 505.18, 269, 270, 505, 505.14, 137/906
See application file for complete search history.

(56) References Cited

U.S. PATENT DOCUMENTS

| | | | |
|---|---|---|---|
| 1,945,834 A | | 2/1934 | Terry |
| 2,042,781 A | * | 6/1936 | Grove ............................ 137/489 |
| 2,261,364 A | * | 11/1941 | Grove ............................ 137/341 |
| 2,273,111 A | | 2/1942 | Kindl |
| 2,599,577 A | | 6/1952 | Norgren |
| 2,619,983 A | | 12/1952 | Roberts |
| 2,624,980 A | | 1/1953 | Hughes |
| 2,664,674 A | | 1/1954 | Niesemann |
| 3,086,548 A | | 4/1963 | Galiger et al. |
| 3,392,749 A | | 7/1968 | Gneiding et al. |
| 3,424,194 A | * | 1/1969 | Heinz et al. .................... 137/461 |
| 3,542,052 A | * | 11/1970 | Irwin ........................... 137/116.5 |
| 3,722,536 A | * | 3/1973 | Hill et al. ................. 137/505.46 |
| 3,742,972 A | * | 7/1973 | Hughes .......................... 137/110 |
| 4,176,677 A | | 12/1979 | Hughes |

(Continued)

FOREIGN PATENT DOCUMENTS

DE    35 32 751 A1    3/1987

(Continued)

OTHER PUBLICATIONS

Emerson Process Management, "64 Series Pressure Reducing Regulator," Natural Gas Regulators Application Guide—Edition V, pp. 367-379 (2005).

(Continued)

*Primary Examiner* — Craig Schneider
*Assistant Examiner* — Jessica Cahill
(74) *Attorney, Agent, or Firm* — Marshall, Gerstein & Borun LLP

(57) ABSTRACT

The present invention provides an integral cantilever monitoring device for a regulator having a positionable vent port that may be disposed proximate the lowest point of the monitoring device to allow drainage of liquids accumulating within the monitoring device due to humidity and precipitation. The monitoring device may also include a connection module allowing the monitoring device to be rotated independently of the actuator and valve body of the regulator to accommodate varying installation environments. The connection module may further include an inlet port for connection to a downstream pressure feedback line when the regulator valve body and connection module portions of a primary downstream pressure feedback passage are out of alignment due to rotation of the monitoring device.

22 Claims, 8 Drawing Sheets

U.S. PATENT DOCUMENTS

| | | | |
|---|---|---|---|
| 5,161,576 A | 11/1992 | Hekkert et al. | |
| 5,285,810 A * | 2/1994 | Gotthelf | 137/340 |
| 5,586,569 A | 12/1996 | Hanning et al. | |
| 6,192,912 B1 * | 2/2001 | Butler et al. | 137/15.19 |
| 6,354,319 B1 * | 3/2002 | Mooney | 137/14 |
| 6,796,326 B2 | 9/2004 | Bayer | |
| 6,886,583 B2 * | 5/2005 | Matsushima et al. | 137/270 |
| 6,923,197 B2 * | 8/2005 | Vitale | 137/12 |
| 2004/0187930 A1 | 9/2004 | Hawkins et al. | |
| 2005/0011554 A1 * | 1/2005 | Davila et al. | 137/269 |
| 2006/0086919 A1 | 4/2006 | Yang | |
| 2007/0272316 A1 | 11/2007 | Zecchi et al. | |
| 2008/0258096 A1 | 10/2008 | Hawkins | |

FOREIGN PATENT DOCUMENTS

| | | |
|---|---|---|
| DE | 40 12 801 A1 | 10/1991 |
| DE | 295 06 395 U1 | 6/1995 |
| DE | 198 21 292 A1 | 11/1999 |
| FR | 2 451 597 A1 | 10/1980 |
| WO | WO-99/23544 A1 | 5/1999 |

OTHER PUBLICATIONS

Emerson Process Management, "66 Series Pressure Reducing Regulators," Natural Gas Regulators Application Guide—Edition V. pp. 30-72 (2005).

Emerson Process Management, "Principles of Direct-Operated Regulators," Natural Gas Regulators Application Guide—Edition V, pp. 471-476 (2005).

Emerson Process Management, "Principles of Series Regulation and Monitor Regulators," Natural Gas Regulators Application Guide—Edition V, pp. 493-495 (2005).

Emerson Process Management, "REGAL 2 Series Pressure Reducing Regulator," Natural Gas Regulators Application Guide—Edition V. pp. 239-245 (2005).

Emerson Process Management, "S200 Series Pressure Reducing Regulators," Natural Gas Regulators Application Guide—Edition V, pp. 259-272 (2005).

Emerson Process Management, "S300 Series Pressure Reducing Regulators," Natural Gas Regulators Application Guide—Edition V, pp. 289-306 (2005).

Emerson Process Management, "Selecting and Sizing Pressure Reducing Regulators," Natural Gas Regulators Application Guide—Edition V, pp. 479-483 (2005).

Emerson Process Management, "Type 63EG Relief Valve/Backpressure Regulator," Natural Gas Regulators Application Guide—Edition V, pp. 329-340 (2005).

Emerson Process Management, "Type EZL Pressure Reducing Regulator for Low Differential Pressure Applications," Natural Gas Regulators Application Guide—Edition V, pp. 169-179 (2005).

International Search Report and Written Opinion for Application No. PCT/US2009/041257, dated Aug. 14, 2009.

International Search Report and Written Opinion for Application No. PCT/US2008/060645, dated Apr. 17, 2008.

International Preliminary Report on Patentability for Application No. PCT/US2008/060645, dated Jun. 22, 2010.

Australian Office Action for Application No. 2008242823, dated Aug. 25, 2011.

International Preliminary Report on Patentability for Application No. PCT/US2009/041001, dated Aug. 30, 2011.

International Preliminary Report on Patentability for Application No. PCT/US2009/041257, dated Oct. 26, 2010.

International Preliminary Report on Patentability for Application No. PCT/US2009/041259, dated Oct. 26, 2010.

International Search Report and Written Opinion for Application No. PCT/US2009/041001, dated Aug. 25, 2011.

International Search Report and Written Opinion for Application No. PCT/US2009/041259, dated Oct. 15, 2010.

* cited by examiner

INTEGRAL OVERPRESSURE MONITORING DEVICE

CROSS-REFERENCE TO RELATED APPLICATIONS

This application claims the benefit of priority to U.S. Provisional Patent Application No. 60/913,076, filed on Apr. 20, 2007, entitled "Integral Overpressure Monitoring Device," which is hereby expressly incorporated by reference herein

FIELD OF THE INVENTION

The present invention relates to fluid flow regulating devices such as gas regulators and, more particularly, to gas regulators having overpressure monitoring devices as a backup to assume control in the event of a failure of the regulator.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of the gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include an overpressure monitoring device. The overpressure monitoring device controls the pressure downstream of the regulator in the event that the regulator fails, thereby allowing the downstream pressure to increase to undesired levels. Accordingly, in the event the regulator fails and the downstream pressure rises above a predetermined monitor setpoint pressure, the overpressure monitoring device operates to close the valve port of the regulator valve and cut off the flow of gas to the downstream components of the gas distribution system. As demand increases, the monitoring device opens the valve port thereby allowing gas flow downstream.

FIG. 1 illustrates one example of a fluid flow regulating device as an inline gas regulator 10 having an integral inline monitoring device 12. The regulator 10 generally comprises a regulator valve body 14 and an actuator 16. The regulator valve body 14 defines an inlet 18 for receiving gas from a gas distribution system, for example, and an outlet 20 for delivering gas to an end-user facility such as a factory, a restaurant, an apartment building, etc. having one or more appliances, for example. Additionally, the regulator valve body 14 includes a valve port 22 disposed between the inlet 18 and the outlet 20. Gas must pass through the valve port 22 to travel between the inlet 18 and the outlet 20 of the regulator valve body 14, and on to the downstream portion of the gas distribution system.

The actuator 16 is coupled to the regulator valve body 14 to ensure that the pressure at the outlet 20 of the regulator valve body 14, i.e., the outlet or downstream pressure, is in accordance with a desired range of outlet or control pressures. The actuator 16 is therefore in fluid communication with the regulator valve body 14 via a downstream pressure feedback line 24 connected through the outer casing of the actuator 16. The actuator 16 includes an actuator control assembly 26 for sensing and regulating the pressure downstream of the regulator valve body 14. Specifically, the control assembly 26 includes a diaphragm 28, a piston 30, and a control linkage 32 connected via a valve stem 34 to a control element of the actuator 16, such as a valve disk 36. The valve disk 36 includes a generally cylindrical body 38 and a sealing insert 40 fixed to the valve stem 34. The body 38 and sealing insert 40 may have passages 42 therethrough extending between the surface of the sealing insert 40 facing the valve port 22 and an upper surface 44 to place the surface of a balancing diaphragm 46 in fluid communication with the upstream pressure. Configured in this manner, the balancing diaphragm 46 exerts a downward force (relative to the orientation of FIG. 1) on the valve disk 36 to counterbalance the upward force of the upstream pressure on the surface of the sealing insert 40, thereby allowing the control assembly 26 to react to the changes in the downstream pressure without undue influence from the upstream pressure.

The diaphragm 28 senses the pressure downstream of the regulator valve body 14. The control assembly 26 further includes a control spring 48 in engagement with a top-side of the diaphragm 28 to offset the sensed downstream pressure. Accordingly, the desired downstream pressure, which may also be referred to as the control pressure, is set by the selection of the control spring 48. The diaphragm 28 is operatively coupled to the control linkage 32, and therefore the valve disk 36, via the piston 30 to control the opening of the regulator valve body 14 based on the sensed downstream pressure. For example, when an end user operates an appliance, such as a furnace, for example, that places a demand on the gas distribution system downstream of the regulator 10, the outlet flow increases, thereby decreasing the downstream pressure. Accordingly, the diaphragm 28 senses this decreased downstream pressure, which allows the control spring 48 to expand and move the piston 30 and the control linkage 32 downward relative to the orientation of FIG. 1. This displacement of the control linkage 32 causes rotation of links 50 to move the valve disk 36 away from the valve port 22 to open the regulator valve body 14. With the opening of the regulator valve body 14, the appliance may draw gas through the valve port 22 toward the outlet 20 of the regulator valve body 14.

In the regulator 10 depicted in FIG. 1, the control assembly 26 further functions to vent gas passing into the upper portion of the regulator 10 in the event of a failure causing a leak in the diaphragm 28. Specifically, the control assembly 26 also includes a relief spring 52 and a failure relieve valve 54. The diaphragm 28 includes an opening 56 through a central portion thereof and the piston 30 includes a sealing cup 58. The relief spring 52 is disposed between the piston 30 and the diaphragm 28 to bias the diaphragm 28 against the sealing cup 58 to close the opening 56 during normal operation. Upon the occurrence of a failure such as a break in the control linkage 32 or links 50, the control assembly 26 is no longer in direct control of valve disk 36 and the valve disk 36 will move into an extreme open position due to the inlet flow. This allows a maximum amount of gas to flow into the actuator 16. Thus, as the gas fills the actuator 16, pressure builds against the diaphragm 28 forcing the diaphragm 128 away from the sealing cup 58, thereby exposing the opening 56. The gas therefore flows through the opening 56 in the diaphragm 28 and toward the failure relief valve 54. Upon the pressure within the actuator 16 and adjacent the failure relief valve 54 reaching a predetermined threshold pressure, the failure relief valve 54 opens to vent the gas through a vent port 60 into the atmosphere or into an attached conduit for collecting vented gas, and thereby indicating an overpressure occurrence and reducing the pressure in the actuator 16.

While the failure relief valve 54 operates to vent gas from the actuator 16, it typically does not relieve sufficient pressure to maintain the downstream pressure below the upper limit for which the regulator 10 is designed to regulate. In such situations, the monitoring device 12 operates to cut off the flow through the regulator valve body 14 until the downstream pressure is reduced after the failure of the regulator 10. In the illustrated example, the monitoring device 12 has a similar configuration as the actuator 16, and the same references with a leading "1" are used to refer to the corresponding elements of the monitoring device 12. Consequently, the downstream pressure feedback line 124 is connected through the outer wall of the casing of the monitoring device 12 to place the upper surface of the diaphragm 128 opposite the control spring 148 in fluid communication with the outlet 20 of the regulator valve body 14. When the regulator 10 functions properly, the downstream pressure remains within the desired range, and the diaphragm 128 of the monitoring device 12 does not deflect against the biasing force of the control spring 148 to close the valve port 22 with a control element of the monitoring device, such as a valve disk 136. Those skilled in the art will understand that the diaphragm 128 and the control spring 148 are configured such that the monitoring device 12 closes the valve port 22 only after the downstream pressure exceeds the upper limit of the normal operating range of pressures maintained by the regulator 10 and reaches a monitor setpoint pressure that is determined based on the load placed on the control spring 148.

FIG. 2 illustrates an example of a cantilever regulator 210 having an integral inline monitoring device 212. In the following discussion, components of the regulator valve body 214 and the actuator 216 of the regulator 210 that are similar to components of the regulator valve body 14 and the actuator 16 of FIG. 1 are identified by the same reference numerals with a leading "2," and components of the monitoring device 212 are identified by the same reference numerals as used in FIG. 1 with the leading "1" replaced by a leading "3." In the actuator 216, an actuator control assembly 226 includes a pivotable control arm 270 operatively coupling the piston 230 to the valve stem 234 to move the valve disk 236 as the diaphragm 228 and piston 230 move in response to changes in the downstream pressure.

The monitoring device 212 is configured with a monitor control assembly 326 having a diaphragm 328 that is a solid piece of material without an opening, and with the control spring 348 disposed on the regulator valve side of the diaphragm 328 to bias the diaphragm 328 away from the valve disk 236. The bottom of the diaphragm 328 is placed in fluid communication with the downstream pressure by a downstream pressure feedback passage 370 extending from an inner surface of the outlet 220 through the casing of the monitoring device 212 to the bottom of the diaphragm 328. When the downstream pressure increases as a result of a failure of the actuator 216, the downstream pressure forces the diaphragm 328 upward to move the valve disk 336 into engagement with the valve port 222 to cut off flow through the regulator valve body 314.

FIG. 3 illustrates an example of a first regulator 210a, with an actuator 216a as shown in FIG. 2 having a regulator valve body 414a that is not configured for attachment of a monitoring device. Instead, an external monitoring device in the form of a second actuator 216b is located upstream of the first actuator 216a to control flow through a second regulator valve body 414b. The interior of the second actuator 216b is isolated by a seal 430, but is placed in fluid communication with the downstream pressure by a downstream pressure feedback line 432 extending from the outlet 420a of the first regulator valve body 414a through the casing of the second actuator 216b. When the downstream pressure rises as a result of a failure of the first actuator 216a, the downstream pressure increase is sensed by the diaphragm 228b of the second actuator 216b to cause the second valve disk 236b to engage the valve port 422b and cut off the flow of gas from a position upstream of the first actuator 210a.

The monitoring systems described above are generally effective in monitoring the pressure downstream of the regulators and cutting off gas flow in the event of a failure of the regulators. However, drawbacks exist in certain implementations of the monitoring devices. For example, when the monitoring devices 12, 212 of FIGS. 1 and 2 are disposed in the orientation illustrated in the drawing figures, the vent ports 160, 360, respectively, are disposed above the lowest points of the casings of the monitoring devices 12, 212. As a result, moisture within the monitoring devices 12, 212 can accumulate below the vent ports 160, 360, and cannot be emptied without opening the casings of the monitoring devices 12, 212. Moisture can enter the actuators 14, 214 and monitoring devices 12, 212 via humid air. When the temperature drops, the moisture in the air condenses to liquid form and drains to the lowest point in the casing of the monitoring devices 12, 212. Moisture may also be introduced by precipitation in the form of rain or snow entering through the vent ports 160, 360. The accumulated moisture can adversely impact the performance of the monitoring device when the temperature drops and the liquid freezes, thereby impairing the ability of the diaphragms 128, 328 and control springs 148, 348 to respond to changes in the downstream pressure. Therefore, a need exists for a monitoring device providing a vent port proximate the lowest point of the monitoring device regardless of the orientation of the monitoring device.

The upstream monitoring device of FIG. 3 is also generally effective at monitoring the pressure downstream from the regulator 210a. However, having the monitoring device disposed remotely from the regulator can add expense due to the requirement for two separate regulator valve bodies to be connected along the flow path. The use of multiple bodies increases the time required and complexity of the installation of the bodies along the pipeline. The cost and complexity of maintenance is also increased. Consequently, it is desirable to provide a monitoring device having improved moisture drainage capabilities as an integral component of the regulator.

SUMMARY

The present invention provides an integral cantilever monitoring device for a regulator having a positionable vent port that may be disposed proximate the lowest point of the monitoring device to allow drainage of liquids accumulating within the monitoring device due to humidity and precipitation. The monitoring device may also include a connection module allowing the monitoring device to be rotated independently of the actuator and valve body of the regulator to accommodate varying installation environments. The connection module may further include an inlet port for connection to a downstream pressure feedback line when the regulator valve body and connection module portions of a primary downstream pressure feedback passage are out of alignment due to rotation of the monitoring device.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
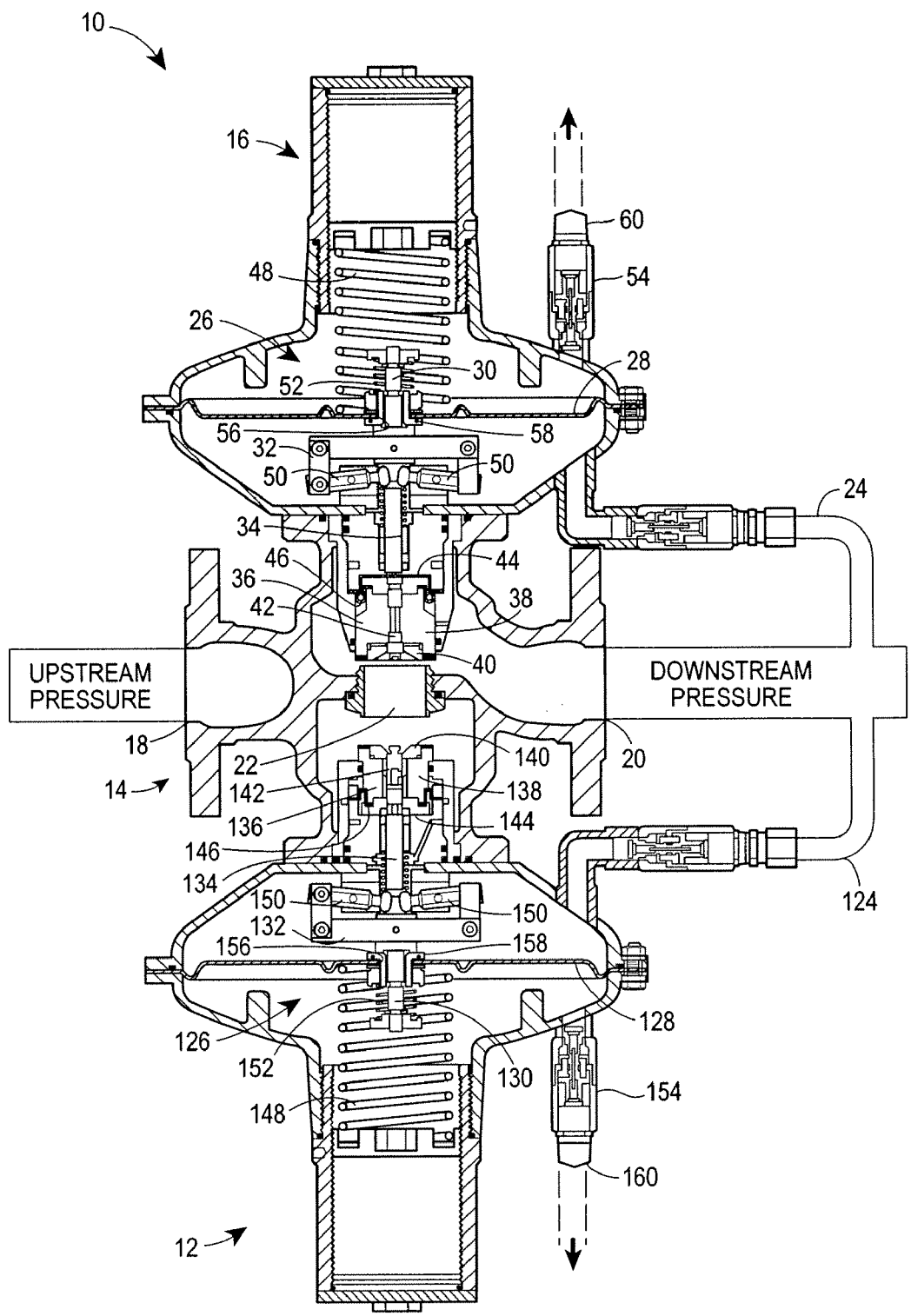
FIG. 1 is a side cross-sectional view of a prior art inline regulator and integral inline monitoring device.
Figure 2:
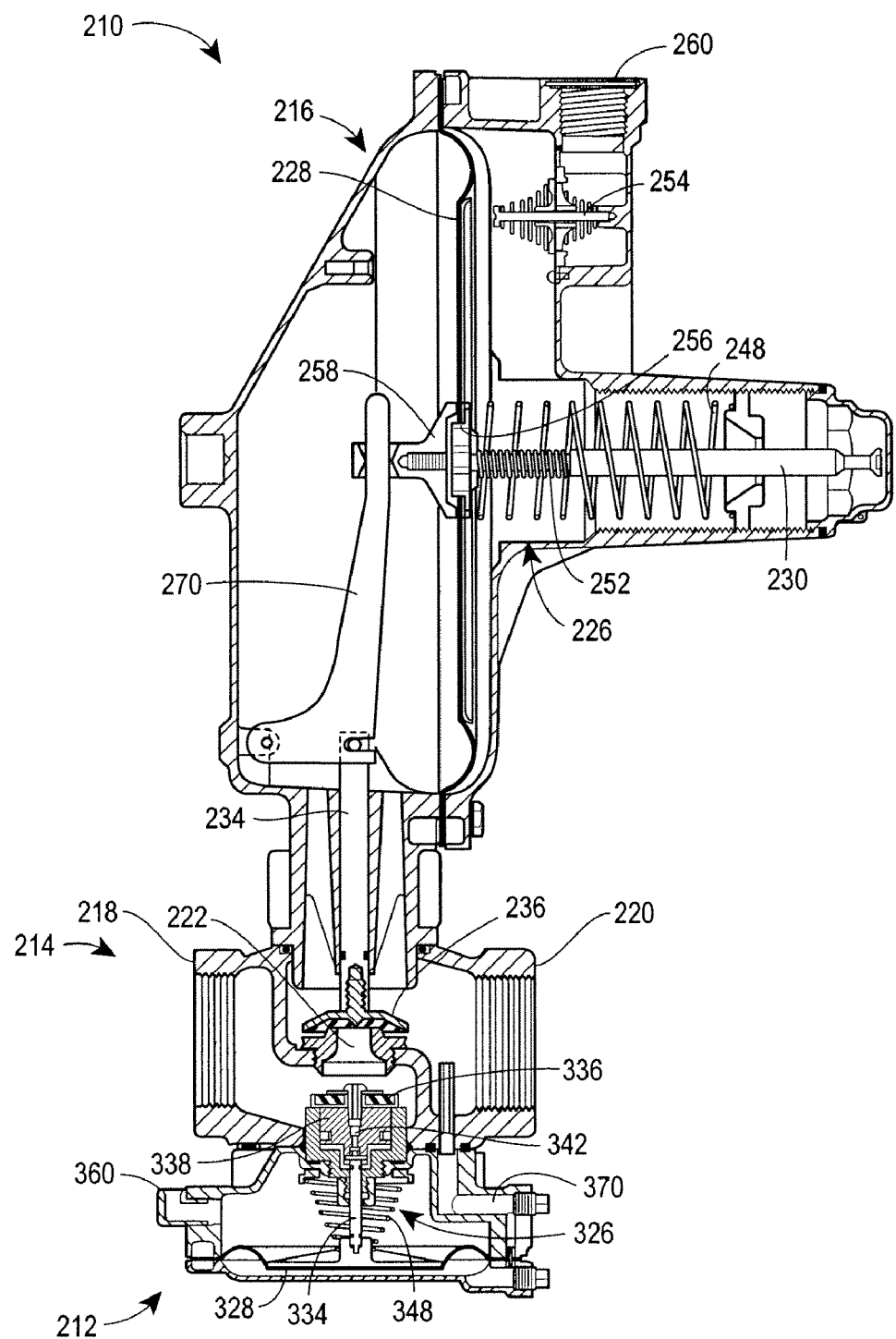
FIG. 2 is a side cross-sectional view of a prior art cantilever regulator and integral inline monitoring device.
Figure 3:
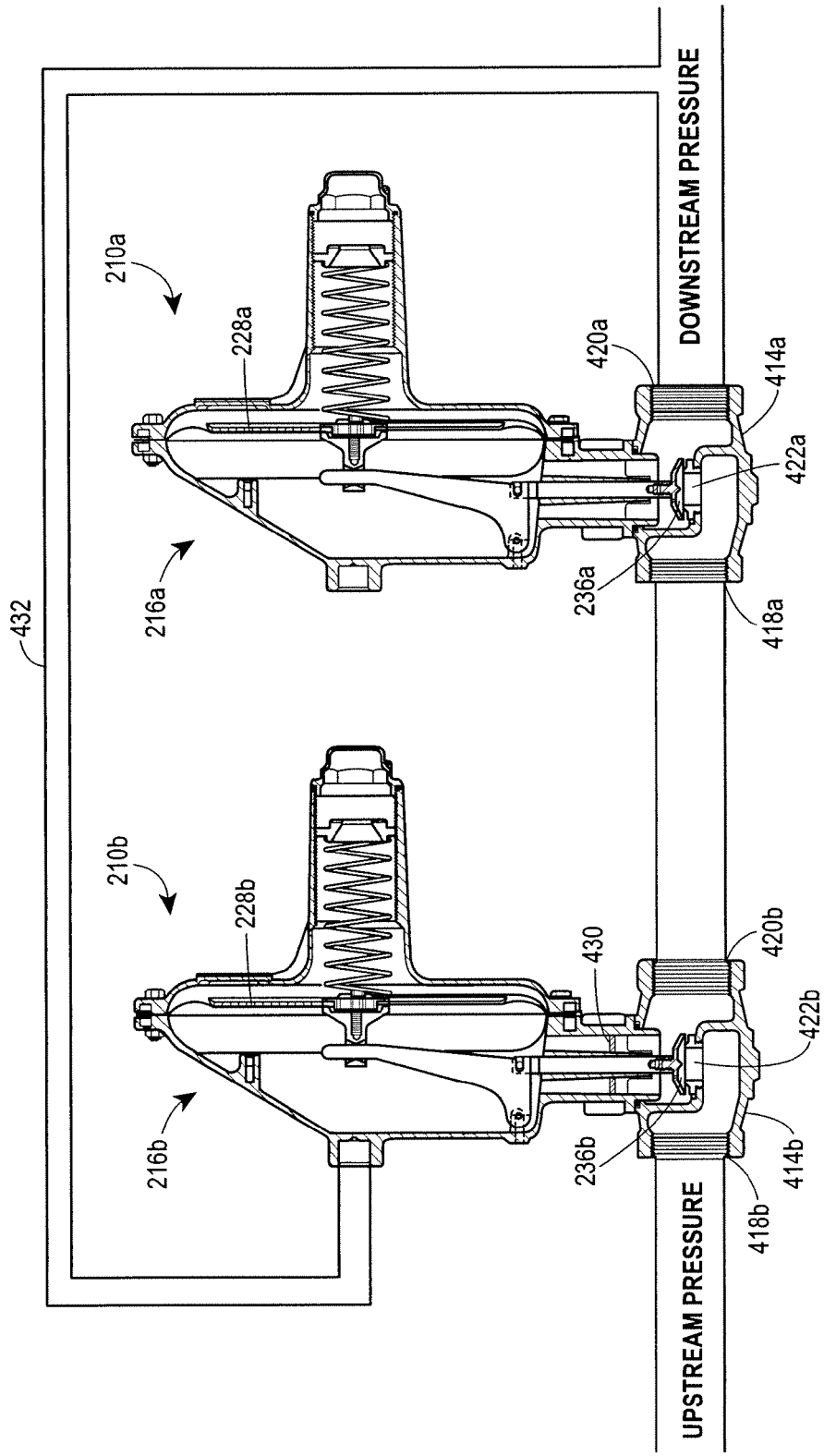
FIG. 3 is a side cross-sectional view of the prior art cantilever regulator of FIG. 2 and an external upstream monitoring device.
Figure 4:
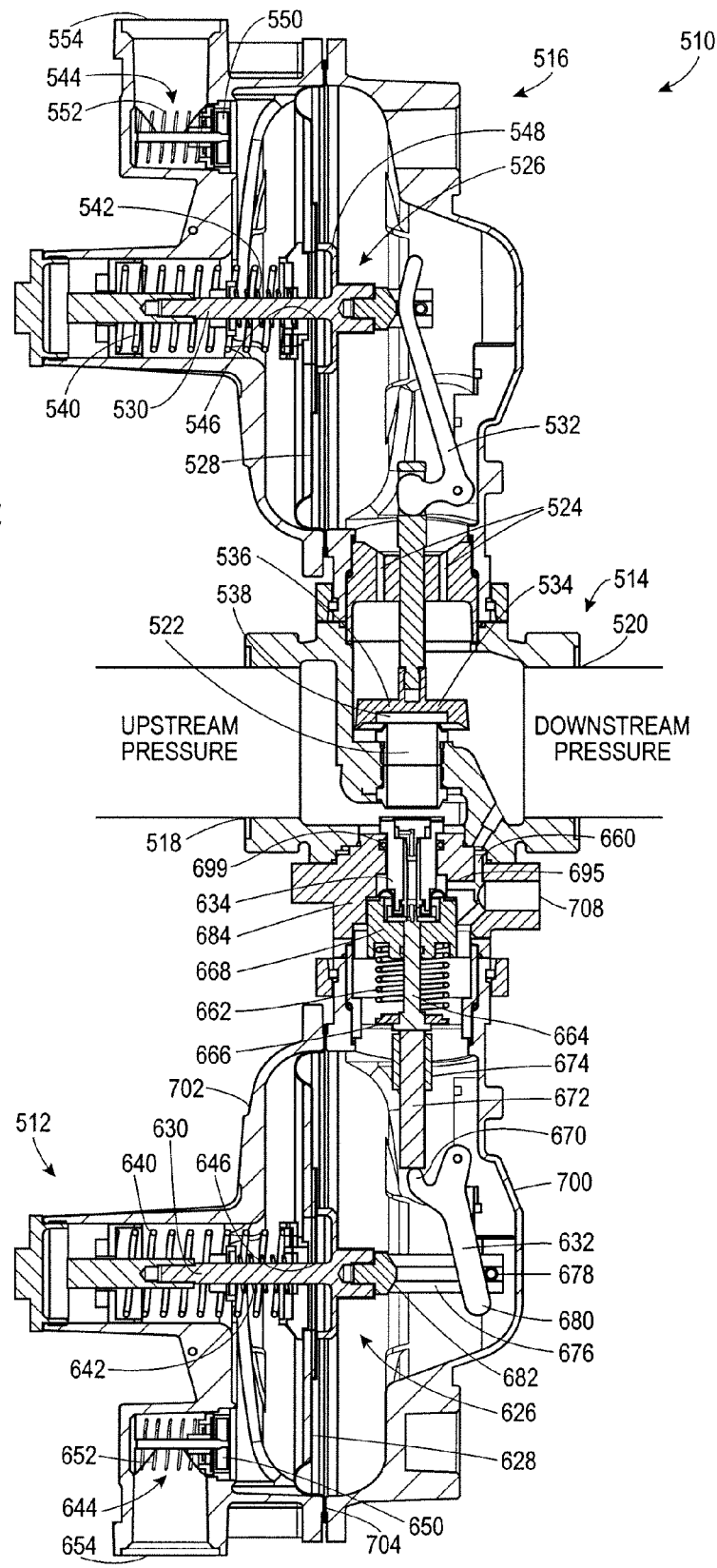
FIG. 4 is a side cross-sectional view of a cantilever regulator and integral cantilever monitoring device.

FIG. 4 illustrates an embodiment of a cantilever gas regulator 510 having an integral cantilever monitoring device 512 for use in a fluid distribution system. The regulator 510 generally comprises a regulator valve body 514 and an actuator 516. The regulator valve body 514 defines an inlet 518 for receiving gas from a gas distribution system, for example, and an outlet 520 for delivering gas to an end-user facility such as a factory, a restaurant, an apartment building, etc. having one or more appliances, for example. Additionally, the regulator valve body 514 includes a valve port 522 disposed between the inlet 518 and the outlet 520. Gas must pass through the valve port 522 to travel between the inlet 518 and the outlet 520 of the regulator valve body 514.

The actuator 516 is coupled to the regulator valve body 514 to ensure that the pressure at the outlet 520 of the regulator valve body 514, i.e., the outlet or downstream pressure, is in accordance with a desired range of outlet or control pressures about an actuator setpoint pressure. To sense the downstream pressure, the actuator 516 is placed in fluid communication with the regulator valve body 514 via passages 524 allowing gas downstream of the valve port 522 to flow into the interior of the actuator 516. The actuator 516 includes an actuator control assembly 526 for sensing and regulating the pressure downstream from the regulator valve body 514. Specifically, the control assembly 526 includes a diaphragm 528, a piston 530, and a control arm 532 having a control element for the actuator 516, such as a valve disk 534. The valve disk 534 extends into the valve body 514 and is displaceable relative to the valve port 522 for controlling the flow of fluid between the inlet 518 and outlet 520. The valve disk 534 moves between a closed position wherein the valve disk 534 engages the valve port 522 to prevent fluid flow through between the inlet 518 and the outlet 520, and an open position wherein the valve disk 534 is disengaged from the valve port 522 to allow fluid flow through the valve body 514. The valve disk 534 may include a generally cylindrical body 536 and a sealing insert 538 fixed to the body 536. The diaphragm 528 senses the outlet pressure of the regulator valve body 514. The control assembly 526 further includes a control spring 540 in engagement with the side of the diaphragm 528 opposite the gas from the outlet 520 to offset the sensed outlet pressure. Accordingly, the range of acceptable downstream pressures, which may also be referred to as the control pressures, is set by the selection of the control spring 540.

The diaphragm 528 is operatively coupled to the control arm 532, and therefore the valve disk 534, via the piston 530 to control the opening of the regulator valve body 514 based on the sensed downstream pressure. As with the regulators described above, when an end user operates an appliance, such as a furnace, for example, that places a demand on the gas distribution system downstream of the regulator 510, the outlet flow increases, thereby decreasing the downstream pressure. Accordingly, the diaphragm 528 senses this decreased downstream pressure. This allows the control spring 540 to expand and move the piston 530 and the upper portion of the control arm rightward, relative to the orientation of FIG. 4. This displacement of the control arm 532 moves the valve disk 534 away from the valve port 522 to open the regulator valve body 514. So configured, the appliance may draw gas through the valve port 522 toward the outlet 520 of the regulator valve body 514.

The control assembly 526 further functions as a relief valve as mentioned above. Specifically, the control assembly 526 also includes a relief spring 542 and a failure relief valve 544. The diaphragm 528 includes an opening 546 through a central portion thereof and the piston 530 includes a sealing cup 548. The relief spring 542 is disposed between the piston 530 and the diaphragm 528 to bias the diaphragm 528 against the sealing cup 548 to close the opening 546 during normal operation. Upon the occurrence of a failure such as a break in the control arm 532, the control assembly 526 is no longer in direct control of valve disk 534 and the valve disk 534 will move into an extreme open position due to the inlet flow. This allows a maximum amount of gas to flow into the actuator 516. Thus, as the gas fills the actuator 516, pressure builds against the diaphragm 528 forcing the diaphragm 528 away from the sealing cup 548, thereby exposing the opening 546. The gas therefore flows through the opening 546 in the diaphragm 528 and toward the failure relief valve 544. The failure relief valve 544 includes a valve plug 550 and a release spring 552 biasing the valve plug 550 into a closed position as shown in FIG. 4. When the pressure within the actuator 516 and adjacent the failure relief valve 544 reaching a predetermined threshold pressure, the valve plug 550 displaces against the bias of the release spring 552 to open and vent the gas through a vent port 554 into the atmosphere or into an attached conduit for collecting vented gas, and thereby reducing the pressure in the actuator 516.

Figure 5:
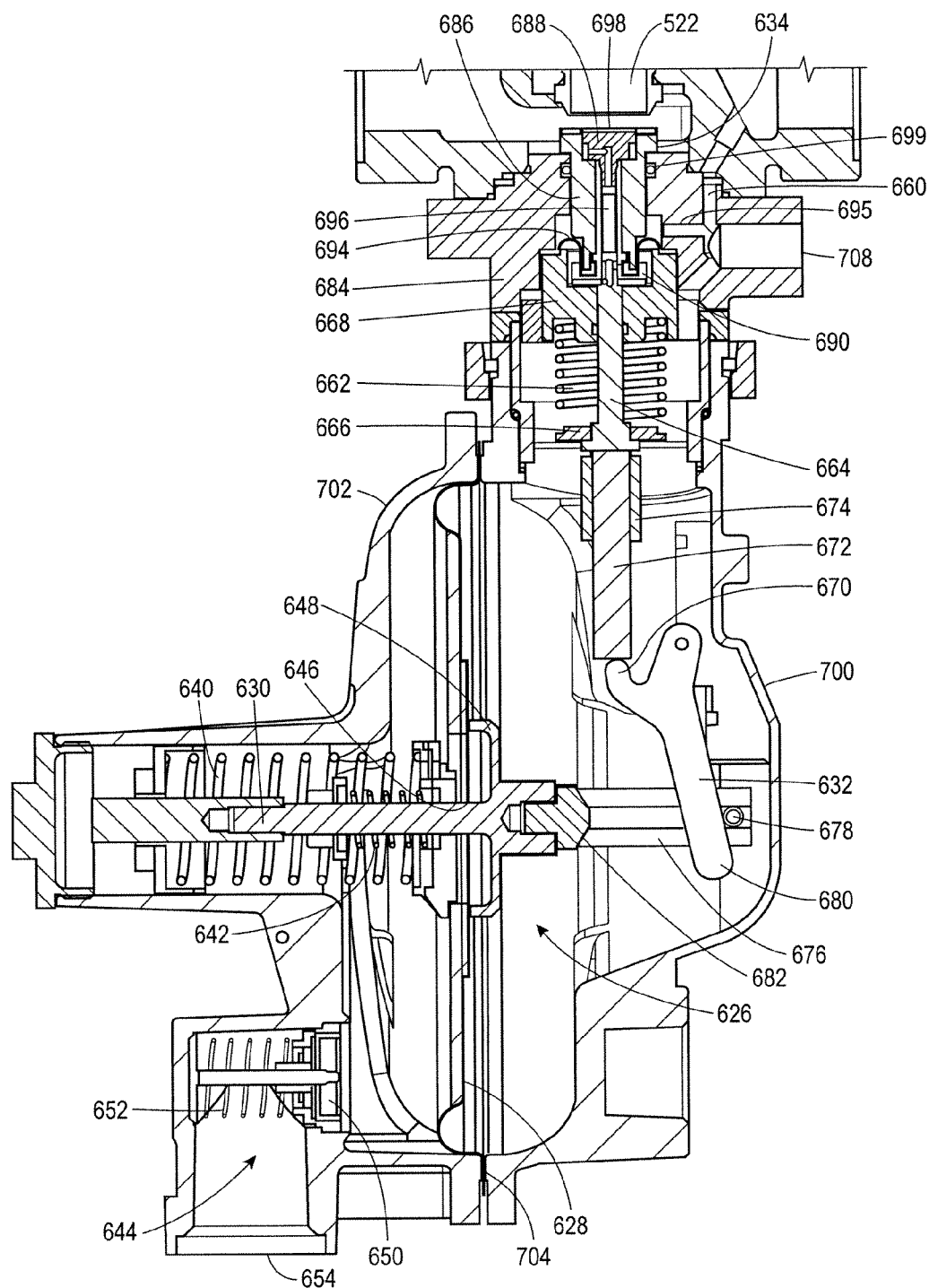
FIG. 5 is an enlarged cross-sectional view of the monitoring device of FIG. 4.

In a failure situation as described above, the monitoring device 512 operates to cut off the flow through the regulator valve body 514 until the downstream pressure is reduced after the failure of the regulator 510. The monitoring device 512 has a similar configuration as the actuator 516, and the same reference numerals with the leading "5" replaced by a leading "6" are used to refer to the corresponding elements of the monitoring device 512. Referring to FIGS. 4 and 5, similar to the actuator 516, the monitoring device 512 is placed in fluid communication with the regulator valve body 514 via a passage 660 allowing gas downstream of the valve port 522 to flow into the interior of the monitoring device 512 so that the diaphragm 628 can sense the downstream pressure. The downstream pressure is in fluid communication with a first side of the diaphragm 628, and a second side of the diaphragm 628 is biased against the force of the downstream pressure by control spring 640.

When the downstream pressure exceeds a monitor setpoint pressure, the monitor control assembly 626 operates in a similar manner as the control assembly 526 to move a control element of the monitoring device 512, such as a valve disk 634, into engagement with the valve port 522 and cut off the flow of gas through the regulator valve body 514. The monitor setpoint pressure is greater than the actuator setpoint pressure and is typically set to allow the regulator 510 to operate the upper limit of the pressure range controlled by the regulator 510. The valve disk 634 extends into the valve body 514 and is displaceable relative to the valve port 522 for allowing or preventing the flow of fluid between the inlet 518 and outlet 520. The valve disk 634 moves between an open position wherein the valve disk 634 is disengaged from the valve port 522 to allow fluid flow through the valve body 514, and a closed position wherein the valve disk 634 engages the valve port 522 to prevent fluid flow through between the inlet 518 and the outlet 520. When the downstream pressure exceeds the monitor setpoint pressure, the diaphragm 628 deflects against the biasing force of the control spring 640 to cause the valve disk 634 to engage the valve port 522 and stop flow of fluid to the downstream portion of the system. In the event of a failure of the diaphragm 628 causing gas to leak through the diaphragm 628, the failure relief valve 644 opens to vent the gas through the vent port 654.

Whereas the actuator 516 is configured to respond to both increases and decreases in the downstream pressure, the monitoring device 512 only responds to excessive increases in the downstream pressure. The monitoring device 512 is configured to maintain the normal open position and to not react to drops in the downstream pressure. The normal open position of the monitoring device 512 is achieved by the inclusion of an opening spring 662 that biases the valve disk 634 away from the valve port 522. The valve disk 634 is connected to a valve stem 664 having a flange 666, with the opening spring 662 being disposed between the flange 666 and a cap 668 at the open end of the monitoring device 512. The valve stem 664 is operatively coupled to a first finger 670 of the control arm 632 by a drive post 672 disposed therebetween and axially slidable within a guide 674.

The piston 630 and control arm 632 of the control assembly 626 are adapted so that movement of the diaphragm 628 and control spring 640 to the right as shown in FIG. 4 due to a drop in the downstream pressure will not cause the piston 630 to engage the control arm 632 and rotate the arm 632 in the counterclockwise direction. The piston 638 includes an extension 676 on the pressurized side of the diaphragm 628. The extension 676 includes a drive pin 678 abutting an outward side of a second finger 680 of the control arm 632, and a shoulder 682 disposed proximate the diaphragm 628 and remotely from the inward surface of the second finger 680. The spacing between the second finger 680 and the shoulder 682 when the monitoring device 512 is in the normal open position allows the piston 630 to move rightward with the diaphragm 628 and control spring 640 if the downstream pressure drops sufficiently to allow the control spring 640 to deflect the diaphragm 628. Conversely, when the downstream pressure increases above the monitor setpoint pressure during a regulator failure and is sufficient to deflect the diaphragm 628 against the biasing forces of the control spring 640 and opening spring 662, the drive pin 678 engages the second finger 680 to rotate the control arm 632 and close the regulator valve body 514.

Figure 6:
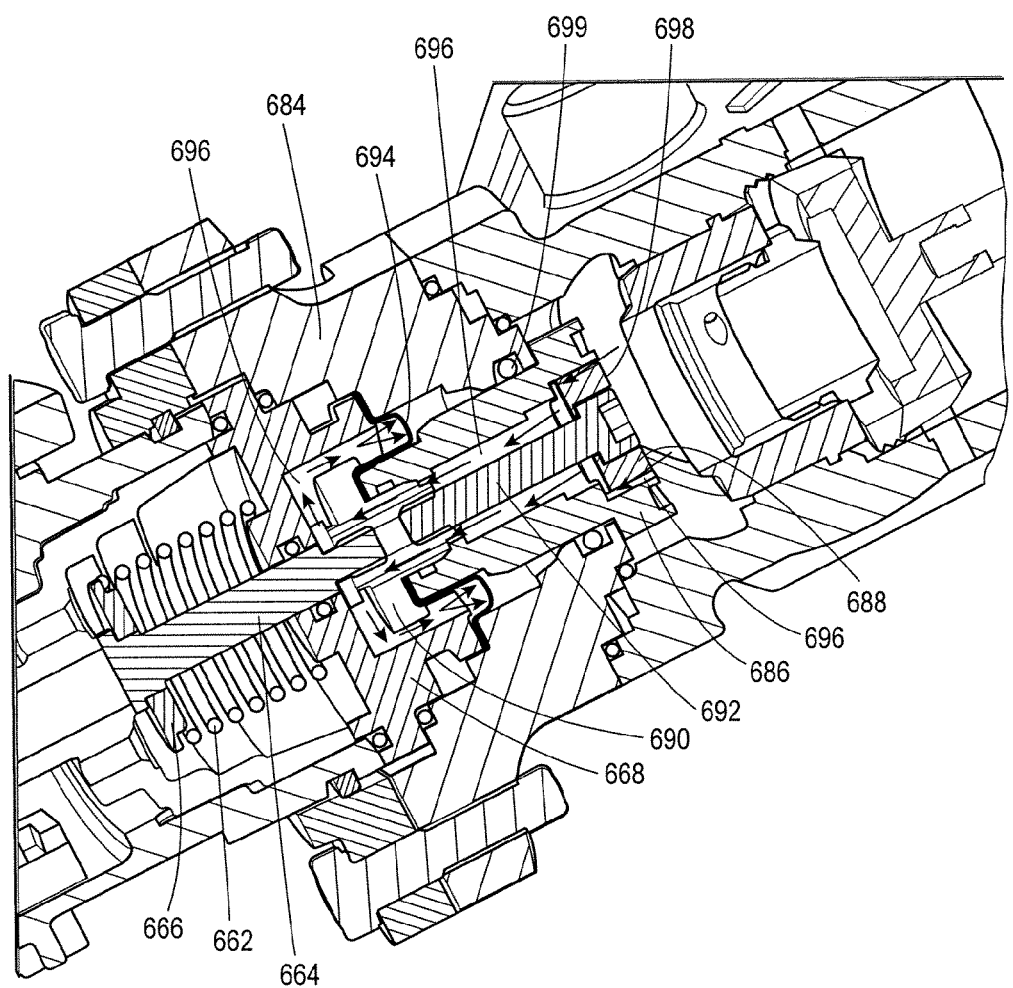
FIG. 6 is an enlarged cross-sectional view of the monitor pressure balancing assembly of the monitoring device of FIG. 4.

Because the monitoring device 512 like the actuator 516 is intended to be responsive to the downstream pressure, it may be desired to minimize the influence of the upstream pressure on the monitoring device 512. One alternative is to reduce the force applied by the opening spring 662 to compensate for the force of the upstream pressure on the valve disk 634 and acting in the same direction. This alternative, however, does not adjust for variations in the upstream pressure since the opening spring 662 will apply the same force regardless of the magnitude of the upstream pressure. Alternatively, the monitoring device 512 implements a monitor balancing assembly that applies a counterbalancing force that is proportional to the magnitude of the upstream pressure. Referring to FIGS. 5 and 6, the monitoring device 512 is connected to the regulator valve body 514 by a monitoring device connection module 684 disposed between the regulator valve body 514 and cap 668. The valve disk 634 has a multi-piece construction including a cylindrical body 686 and oppositely disposed insert 688 and connection member 690 that are connected and configured to move together in corresponding recesses or bores of the cap 668 and connection module 684. As shown in FIG. 6, the components of the valve disk 634 may be connected by an axial bolt 692 with the valve stem 664 being attached to the opposite side of the connection member 690.

The counterbalancing force is provided by a balancing diaphragm 694. The diaphragm 694 is circular with a central aperture, and may be a convolution diaphragm, and has an outer circumference pressed between the cap 668 and connection module 684, and an inner circumference pressed between the body 686 and connection member 690 to form air-tight seals. A first side of the diaphragm may engage the cylinder body 686. The components of the valve disk 634 have passages 696 passing therethrough to place the surface 698 of the valve disk 634 facing the valve port 522 in fluid communication with a second side of the balancing diaphragm 694 as indicated by the arrows in FIG. 6 such that the diaphragm 694 senses the upstream pressure at the entrance to the valve port 522 and the first side of the balancing diaphragm applies a corresponding force to the cylinder body 686. A channel 695 from the passage 660 places the opposite surface of the balancing diaphragm 694 in fluid communication with the downstream pressure to prevent the development of a vacuum above the diaphragm 694. An O-ring seal 699 prevents the upstream and downstream pressures from mixing proximate the valve disk 634. Additional O-rings and other seals are provided where necessary to prevent mixing of the downstream, upstream and atmospheric pressures. As the upstream pressure varies, the balancing diaphragm 694 imparts a force on the valve disk 634 proportional to the force of the upstream pressure on the surface 698 and in the opposite direction, with the magnitude of the counterbalancing force being approximately equal to the upstream pressure multiplied by the effective surface area of the balancing diaphragm 694. If desired, the balancing diaphragm 694 may be configured so that the force applied by the balancing diaphragm 694 is approximately equal to the force applied to the valve disk 634 by the upstream pressure plus the biasing force applied by the opening spring 662.

As discussed above, the accumulation of moisture within the monitoring device 512 can be detrimental to the responsiveness of the monitoring device 512, particularly in environments where the temperature can drop below freezing. By using the cantilever design, the outlet port 654 may be oriented at the lowest point of the monitoring device 512 as shown in FIG. 4. The vent port 654 may place the second side of the diaphragm 628 in fluid communication with the ambient atmosphere surrounding the monitoring device 512 and permit drainage of the moisture that collects at the bottom of the housing 700 when the failure relief valve 644 is in the open position. In this design, the diaphragm 628 of the monitoring device 512 is oriented with a plane approximately parallel to the direction of movement of the valve disk 634 and approximately perpendicular to the direction of fluid flow into the inlet 518 and out of the outlet 520 of the valve body 514. The monitoring device 512 includes a housing 700 enclosing the diaphragm 628, the piston 630, the control arm 632, the control spring 640 and other components of the control assembly 626. The housing 700 may include a main portion and a cover 702 overlaying an opening of the housing 700 and being attached thereto to retain the components of the monitoring device 512 therein. The diaphragm 628 may have an annular flange 704 extending outwardly from an outer edge of the diaphragm 628 such that the flange 704 is pressed between the main portion of the housing 700 at the opening and the cover 702 when the cover 702 is attached thereto.

Figure 7:
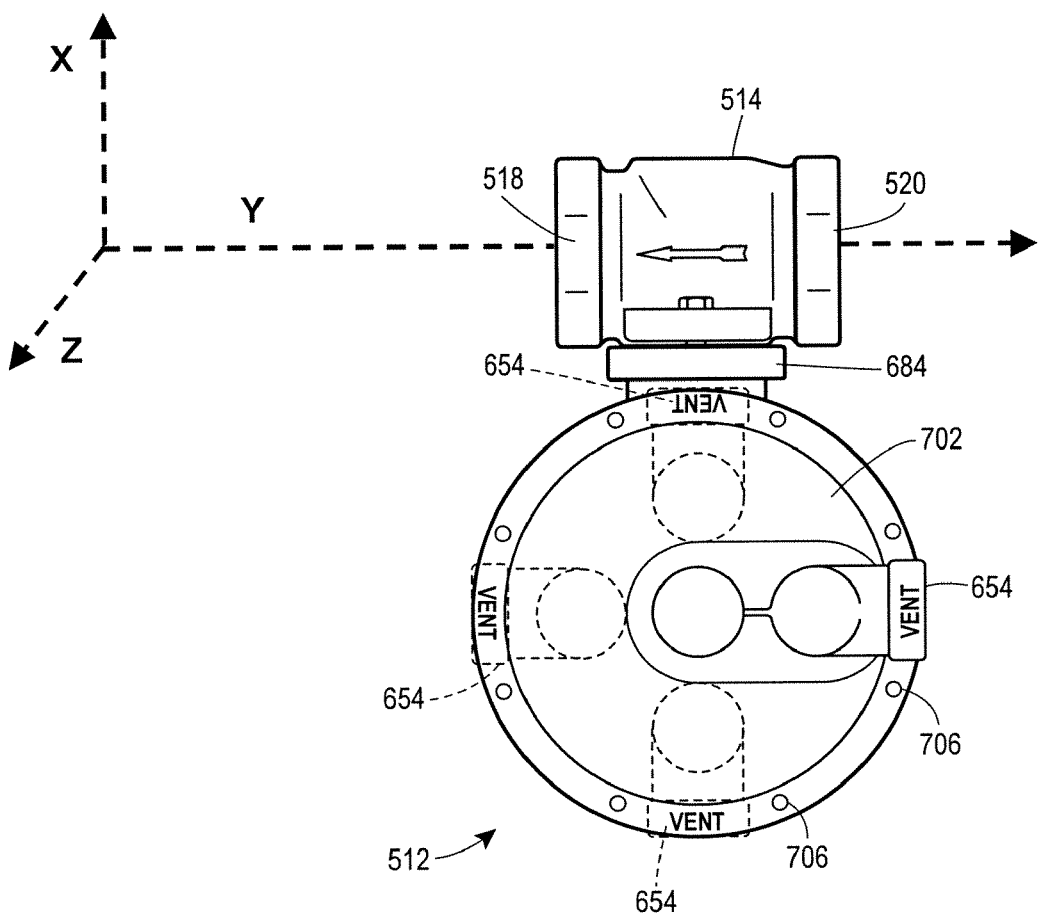
FIG. 7 is a side view of the cover of the monitoring device of FIG. 4.

As shown in FIG. 7, the cover 702 of the housing 700 in which the vent port 654 is cast may be configured for attachment to the monitoring device 512 in multiple positions so that the vent port 654 may be oriented proximate the lowest point of the monitoring device 512 regardless of the orientation of the regulator 510 and monitoring device 512. While the regulator 510 is shown with the actuator 516 disposed vertically above the monitoring device 512, the regulator 510 may be rotated about the Y-axis of FIG. 7 to fit the actuator 516 and monitoring device 512 between other equipment. Moreover, rotation of the regulator 510 about the Z-axis may be required if the piping is running uphill or downhill toward the downstream portion of the system.

The cover 702 may overlay the opening in the housing 700 and be connected to the housing 700 of the monitoring device 512 by a plurality of bolts 706. The housing 700 may have a plurality of circumferentially spaced holes disposed about the opening, and the cover 702 may include a corresponding plurality of circumferentially spaced holes that are alignable with the holes of the housing 700 such that the cover 702 may be connected in any one of eight discrete positions as necessary to place the vent port 654 proximate the lowest point of the monitoring device 512. Of course, those skilled in the art will understand that other connection mechanisms may be used to connect the cover 702 to the housing 700 of the monitoring device 512 in any of a plurality of positions, which may be discretely defined or infinitely adjustable, to dispose the vent port 654 at the lowest position, and such connection mechanisms are contemplated by the applicant as having use in a monitoring device 512 in accordance with the present disclosure.

As discussed above, the orientation of the monitoring device 512 may vary based on the orientation of the regulator valve body 514 necessary to connect the regulator 510 to the pipeline and to accommodate adjacent devices of the gas distribution system. However, it may be necessary or desired to reorient the monitoring device 512 relative to the regulator valve body 514 and actuator 516 through rotation of the monitoring device 512 about the X-axis of FIG. 7. For example, it may be difficult to drain accumulated liquid from the monitoring device 512 in installations wherein the actuator 516 and monitoring device 512 are oriented horizontally relative to each other. If would be preferable if the monitoring device 512 were rotated about the axis of the valve disk 634 such that a portion of the outer edges of the housing 700 and diaphragm 628 are disposed proximate the lowest point of the monitoring device 512 to allow the liquid to drain through the vent port 654. To accomplish such relative displacement, the connection module 684 may be configured in a similar manner as described for the cover 702, such as with circumferentially spaced bolts or other connection mechanism, so that the connection module 684 and monitoring device 512 may be rotated about an axis such as the X-axis passing through the valve disk 634 and valve stem 664 and secured at the desired position.

When in the position shown in FIGS. 4 and 5, the portion of the passage 660 within the connection module 684 is aligned with the portion within the regulator valve body 514. When the connection module 684 is rotated, the portions of the passage 660 are out of alignment such that the monitoring device 512 is not longer in fluid communication with the outlet 520. To facilitate sensing of the downstream pressure in orientations of the monitoring device 512 when the passage portions are out of alignment, the connection module 684 includes an inlet port 708 placing the passage 660 in fluid communication with the exterior of the connection module 684. When the passage portions are aligned, the inlet port 708 is capped to prevent leakage of gas. When the passages are out of alignment due to the reorientation of the monitoring device 512, the inlet port 708 may be connected to the pipeline at a location downstream of the regulator valve body 514 via a downstream pressure feedback line. In this way, the diaphragm 628 may be placed in fluid communication with the downstream pressure regardless of the orientation of the monitoring device 512 with respect to the regulator valve body 514.

Figure 8:
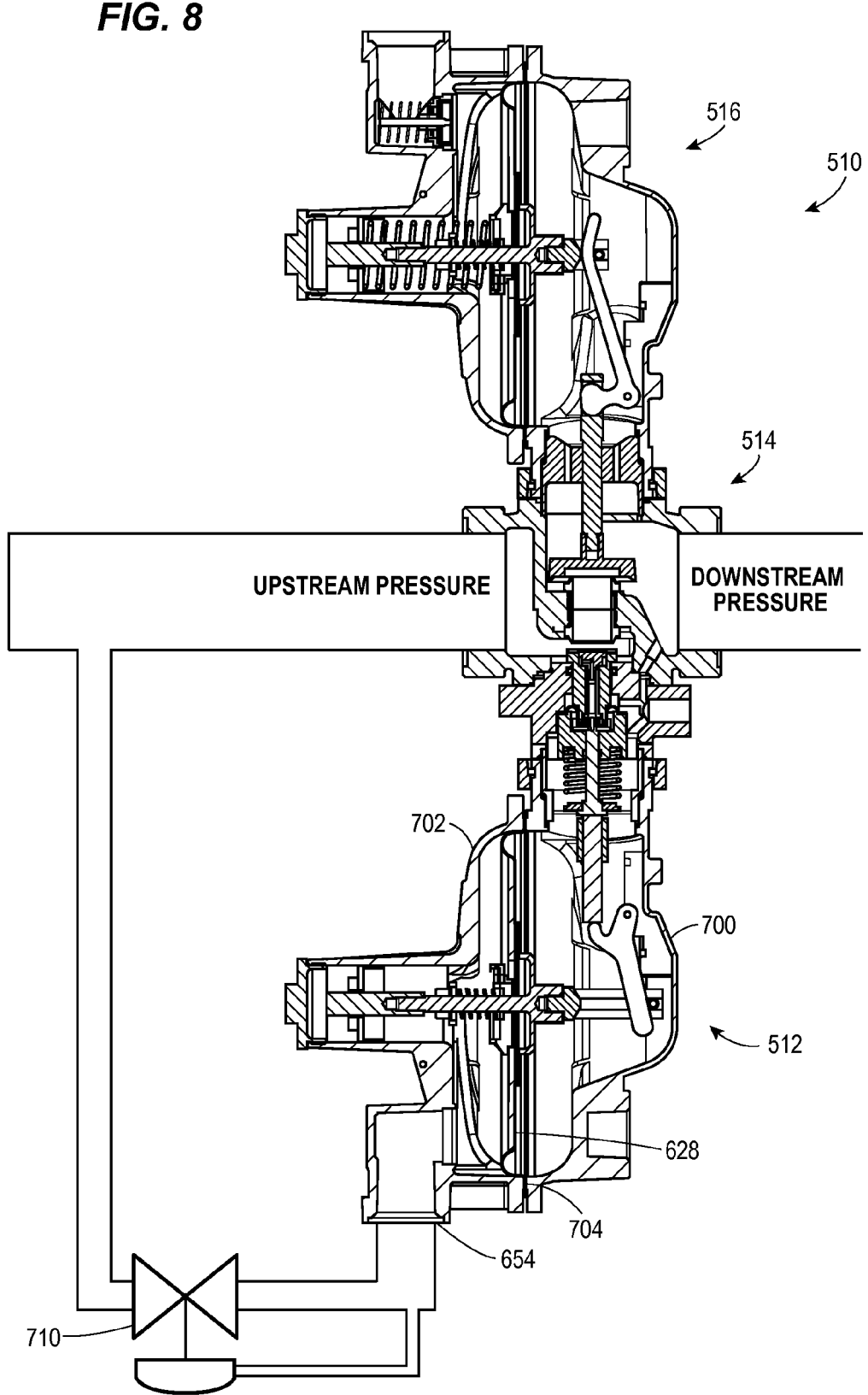
FIG. 8 is a schematic view of an alternative embodiment of the monitoring device of FIG. 4 with an associated pressure load device.

The illustrated configuration of the integral cantilever monitoring device 512 is exemplary, and other configurations of the monitoring device are contemplated. For example, FIG. 8 schematically illustrates an embodiment of the monitoring device 512 where a pressure load device 710 applies a preload input pressure to the second side of the diaphragm 628. The pressure load device 710 is in fluid communication with the upstream pressure created by an upstream fluid source at its inlet and outputs the preload pressure through the vent port 654 to the monitoring device 512. Consequently, the preload input pressure is applied on the side of the diaphragm opposite the downstream pressure. The pressure load device 710 is reconfigured to provide a preload pressure to bias the diaphragm 628 toward the open position and against the force of the downstream pressure, thereby replacing the control spring 640 with the preload input pressure as the loading element for the monitoring device 512. Configured in this way, the preload input pressure provides a constant force to balance against the downstream pressure.

Standard actuators use a spring force to balance against the force created by the downstream pressure multiplied by the effective area of the diaphragm. The nature of a compression spring is to produce less force as it expands. Accordingly, as downstream pressure drops, and the spring forces overcomes the reduced force created by the downstream pressure against the diaphragm, the spring elongates and reduces its force output. When the downstream demand is met by the flow through the valve body, this new steady state or equilibrium point is at a lower outlet pressure than previous because the force balance between the spring and the outlet pressure takes into account the extend spring. This drop in steady state outlet pressure as the downstream demand increases is called "droop." Stated differently, droop is the drop in outlet pressure as downstream demand increases. In a perfect world and a perfect regulator, outlet pressure would not drop as demand increases. By removing the spring and using pressure instead, the contribution to the droop effect from the spring, called spring effect, is eliminated. Droop still occurs for other reasons, primarily because the diaphragm effective area changes throughout the stroke of the regulator, but the magnitude of the droop is reduced significantly through pressure loading the regulator.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A monitoring device for a fluid flow regulating device having a valve body with an inlet, an outlet and a valve port, and an actuator with an actuator control element and an actuator control assembly for sensing and regulating a pressure downstream of the fluid flow regulating device to maintain the downstream pressure approximately equal to an actuator setpoint pressure, the monitoring device comprising:
   a monitor control element extending into the valve body and displaceable relative to the valve port for allowing and preventing the flow of a fluid between the inlet and the outlet, wherein the monitor control element is moveable between an open position wherein the monitor control element is disengaged from the valve port to allow fluid flow between the inlet and the outlet, and a closed position wherein the monitor control element engages the valve port to prevent fluid flow between the inlet and the outlet, and
   a diaphragm operatively connected to the monitor control element and having a plane perpendicular to the direction of fluid flow into the inlet and out of the outlet of the valve body, wherein a first side of the diaphragm is in fluid communication with the pressure downstream of the fluid flow regulating device and a second side of the diaphragm is biased against the force applied by the downstream pressure to the first side, wherein the diaphragm deflects to move the monitor control element to the closed position when the downstream pressure is greater than a monitor setpoint pressure, and wherein the monitor setpoint pressure is greater than the actuator setpoint pressure,
   wherein an upstream pressure within the valve body applies a force to the diaphragm to bias the monitor control element in the direction of the open position, and wherein the monitoring device comprises a balancing diaphragm having a first side engaging the monitor control element and a second side in fluid communication with the upstream pressure such that the balancing diaphragm applies a force to the monitor control element in the direction of the closed position; and
   further comprising an opening spring biasing the monitor control element toward the open position, and wherein the balancing diaphragm is configured so that the force applied by the balancing diaphragm is approximately equal to the force applied by the upstream pressure plus the biasing force applied by the opening spring.

2. A monitoring device in accordance with claim 1, comprising a control arm operatively connected to the monitor control element and the diaphragm such that deflection of the diaphragm when the downstream pressure is greater than the monitor setpoint pressure causes the control arm to move the monitor control element to the closed position.

3. A monitoring device in accordance with claim 1, comprising a control spring biasing the diaphragm against the force applied by the downstream pressure.

4. A monitoring device in accordance with claim 1, wherein the balancing diaphragm is a convolution diaphragm.

5. A monitoring device in accordance with claim 1, wherein the force applied by the balancing diaphragm to the monitor control element is proportional to and counterbalances the force of the upstream pressure on the monitor control element and is approximately equal to the upstream pressure multiplied by the effective surface area of the balancing diaphragm.

6. A monitoring device in accordance with claim 1, comprising a pressure load device in fluid communication with the second side of the diaphragm and applying a preload pressure to the second side of the diaphragm biasing the diaphragm against the force applied by the downstream pressure.

7. A monitoring device in accordance with claim 6, wherein the pressure load device comprises an inlet in fluid communication with an upstream fluid source and an outlet in fluid communication with the diaphragm to apply the preload pressure to the second side of the diaphragm.

8. A monitoring device in accordance with claim 1, comprising a housing having a cover with a vent port placing the interior of the housing in fluid communication with ambient atmosphere surrounding the monitoring device, wherein the housing and the cover are configured for attachment of the cover in a plurality of positions such that the vent port may be disposed proximate a lowest point of the monitoring device so that liquid accumulating within the monitoring device collects proximate the vent port for drainage from the monitoring device.

9. A monitoring device in accordance with claim 8, wherein the housing includes a circular opening and the cover is configured to overlay the opening of the housing, and wherein the housing further includes a plurality of circumferentially spaced holes disposed about the opening and the cover includes a corresponding plurality of circumferentially spaced holes that are alignable with the holes of the housing at a plurality of discrete positions of the cover to dispose the vent port of the cover proximate the lowest point of the monitoring device.

10. A monitoring device in accordance with claim 8, comprising a connection module connecting the monitoring device to the valve body and having an inlet port in fluid communication with the first side of the diaphragm to communicate the downstream pressure to the first side of the diaphragm, wherein the valve body and the connection module are configured for attachment of the monitoring device in a plurality of positions such that an outer edge of the cover may be disposed proximate the lowest point of the monitoring device so that the vent port may be disposed proximate the lowest point of the monitoring device.

11. A monitoring device in accordance with claim 10, wherein the connection module comprises a downstream pressure feedback passage in fluid communication with the inlet port and the first side of the diaphragm and that aligns with a corresponding passage through the valve body to the outlet of the valve body when the connection module is oriented in one of its positions to place the first side of the diaphragm in fluid communication with the downstream pressure at the outlet of the valve body.

12. A fluid flow regulating device, comprising:
a valve body having an inlet, an outlet and a valve port disposed between the inlet and the outlet and allowing fluid to flow from an upstream fluid source through the inlet, the valve port and the outlet to a downstream portion of a fluid distribution system;
an actuator coupled to the valve body and comprising an actuator control assembly for sensing and regulating a pressure downstream of the fluid flow regulating device, the control assembly comprising an actuator control element extending into the valve body and displaceable relative to the valve port for controlling the flow of a fluid between the inlet and the outlet, wherein the actuator control element moves between a closed position wherein the actuator control element engages the valve port to prevent fluid flow between the inlet and the outlet, and an open position wherein the actuator control element is disengaged from the valve port to allow fluid flow between the inlet and the outlet, and wherein the actuator control assembly is in fluid communication with the downstream pressure such that the actuator control element moves to positions between the open position and the closed position in response to the changes in the downstream pressure to maintain the downstream pressure approximately equal to an actuator setpoint pressure; and
a monitoring device coupled to the valve body, the monitoring device comprising:
a monitor control element extending into the valve body and displaceable relative to the valve port for allowing and preventing the flow of a fluid between the inlet and the outlet, wherein the monitor control element is moveable between an open position wherein the monitor control element is disengaged from the valve port to allow fluid flow between the inlet and the outlet, and a closed position wherein the monitor control element engages the valve port to prevent fluid flow between the inlet and the outlet, and
a diaphragm operatively connected to the monitor control element and having a plane parallel to the direction of movement of the monitor control element between the open and closed positions, wherein a first side of the diaphragm is in fluid communication with the pressure downstream of the fluid flow regulating device and a second side of the diaphragm is biased against the force applied by the downstream pressure to the first side, wherein the diaphragm deflects to move the monitor control element to the closed position when the downstream pressure is greater than a monitor setpoint pressure, and wherein the monitor setpoint pressure is greater than the actuator setpoint pressure, wherein an upstream pressure within the valve body applies a force to the diaphragm to bias the monitor control element in the direction of the open position, and wherein the monitoring device comprises a balancing diaphragm having a first side engaging the monitor control element and a second side in fluid communication with the upstream pressure such that the balancing diaphragm applies a force to the monitor control element in the direction of the closed position; and
wherein the monitoring device comprises an opening spring biasing the monitor control element toward the open position, and wherein the balancing diaphragm is configured so that the force applied by the balancing diaphragm is approximately equal to the force applied by the upstream pressure plus the biasing force applied by the opening spring.

13. A fluid flow regulating device in accordance with claim 12, wherein the monitoring device comprises a control arm operatively connected to the monitor control element and the diaphragm such that deflection of the diaphragm when the downstream pressure is greater than the monitor setpoint pressure causes the control arm to move the monitor control element to the closed position.

14. A fluid flow regulating device in accordance with claim 12, wherein the monitoring device comprises a control spring biasing the diaphragm against the force applied by the downstream pressure.

15. A monitoring device in accordance with claim 12, wherein the balancing diaphragm is a convolution diaphragm.

16. A monitoring device in accordance with claim 12, wherein the force applied by the balancing diaphragm to the monitor control element is proportional to and counterbalances the force of the upstream pressure on the monitor control element and is approximately equal to the upstream pressure multiplied by the effective surface area of the balancing diaphragm.

17. A fluid flow regulating device in accordance with claim 12, comprising a pressure load device in fluid communication with the second side of the diaphragm and applying a preload pressure to the second side of the diaphragm biasing the diaphragm against the force applied by the downstream pressure.

18. A fluid flow regulating device in accordance with claim 17, wherein the pressure load device comprises an inlet in fluid communication with the upstream fluid source and an outlet in fluid communication with the monitoring device to apply the preload pressure to the second side of the diaphragm.

19. A fluid flow regulating device in accordance with claim 12, wherein the monitoring device comprises a housing having a cover with a vent port placing the interior of the housing in fluid communication with ambient atmosphere surrounding the monitoring device, wherein the housing and the cover are configured for attachment of the cover in a plurality of positions such that the vent port may be disposed proximate a lowest point of the monitoring device so that liquid accumulating within the monitoring device collects proximate the vent port for drainage from the monitoring device.

20. A fluid flow regulating device in accordance with claim 19, wherein the housing includes a circular opening and the cover is configured to overlay the opening of the housing, and wherein the housing further includes a plurality of circumferentially spaced holes disposed about the opening and the cover includes a corresponding plurality of circumferentially spaced holes that are alignable with the holes of the housing at a plurality of discrete positions of the cover to dispose the vent port of the cover proximate the lowest point of the monitoring device.

21. A fluid flow regulating device in accordance with claim 19, wherein the monitoring device comprises a connection module connecting the monitoring device to the valve body and having an inlet port in fluid communication with the first side of the diaphragm to communicate the downstream pressure to the first side of the diaphragm, wherein the valve body and the connection module are configured for attachment of the monitoring device in a plurality of positions such that an outer edge of the cover may be disposed proximate the lowest point of the monitoring device so that the vent port may be disposed proximate the lowest point of the monitoring device.

22. A fluid flow regulating device in accordance with claim 21, wherein the connection module comprises a downstream pressure feedback passage in fluid communication with the inlet port and the first side of the diaphragm and that aligns with a corresponding passage through the valve body to the outlet of the valve body when the connection module is oriented in one of its positions to place the first side of the diaphragm in fluid communication with the downstream pressure at the outlet of the valve body.

* * * * *